United States Patent [19]

Lowry

[11] 3,752,906

[45] Aug. 14, 1973

[54] VIDEO-TO-FILM CONVERSION PROCESS

[75] Inventor: John D. Lowry, Willowdale, Ontario, Canada

[73] Assignee: Ellain Investments, Ltd., Toronto, Ontario, Canada

[22] Filed: Dec. 20, 1971

[21] Appl. No.: 209,859

[52] U.S. Cl. ...... 178/5.4 CD, 178/6.6 A, 178/6.7 A

[51] Int. Cl. ........ H04n 5/78, H04n 5/84, H04n 9/02

[58] Field of Search .................. 178/5.4 CD, 6.6 A, 178/6.7 A

[56] References Cited

UNITED STATES PATENTS

| | | | |
|---|---|---|---|
| 3,600,504 | 8/1971 | Reilly | 178/5.4 CD |
| 3,685,899 | 8/1972 | Reeds | 178/5.4 CD |

*Primary Examiner*—Howard W. Britton
*Attorney*—Harry G. Weissenberger

[57] ABSTRACT

A color videotape-to-film conversion process uses a random-access storage medium to store a group of color image fields. Selected stored image fields are then repeatedly retrieved for the successive decoding and recording of the primary colors. For each color, the retrieved fields are combined in varying order for noise reduction, frame rate conversion, and luminance-chroma separation. The monochromatic combined fields are then recorded on film in pairs as monochromatic frames, with a full blank field between frames to provide adequate time for film advance and precision registration. Internally clocked timing means control the storage, selection, and retrieval of the video tape signals.

10 Claims, 1 Drawing Figure

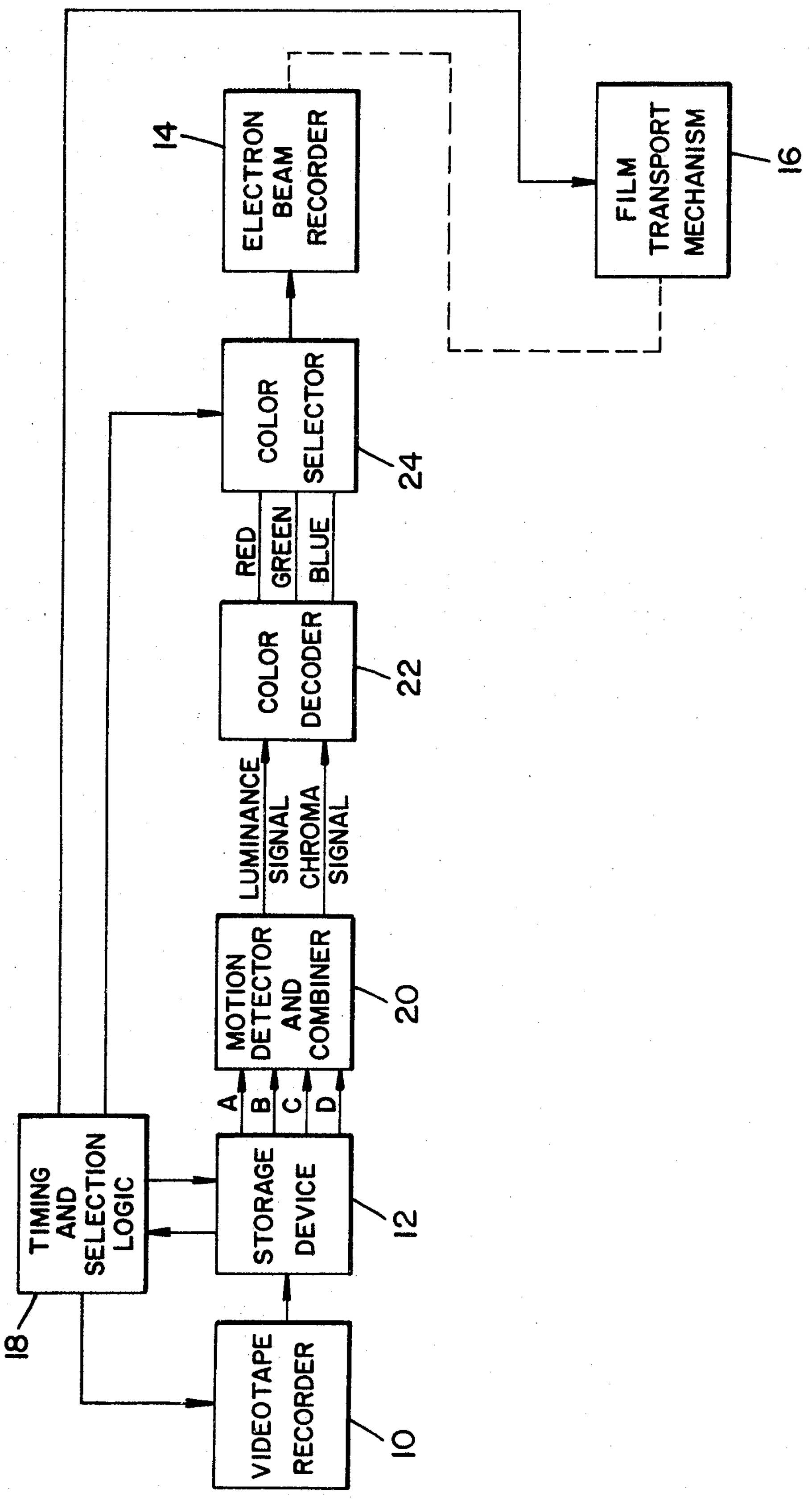
VIDEOTAPE RECORDER
10
STORAGE DEVICE
12
TIMING AND SELECTION LOGIC
18
A
B
C
D
MOTION DETECTOR AND COMBINER
20
LUMINANCE SIGNAL
CHROMA SIGNAL
COLOR DECODER
22
RED
GREEN
BLUE
COLOR SELECTOR
24
ELECTRON BEAM RECORDER
14
FILM TRANSPORT MECHANISM
16

VIDEO-TO-FILM CONVERSION PROCESS

BACKGROUND OF THE INVENTION

Systems for recording a black-and-white video tape image onto motion picture film have been known for some time. The objective of these systems is to reduce the cost of motion picture production by greatly reducing or eliminating the cost of film stock and processing for the waste footage which is edited out of the finished movie, and which often represents as much as 90 percent of the total footage shot. In addition, such systems produce considerable savings of shooting time by providing an instant replay capability.

Orginally, these systems consisted simply of a television monitor screen on which the video image was displayed, and a motion picture camera to photograph the television screen. Later, electron beam recorders came on the market for recording the television image directly on electron-sensitive film by scanning the film with an electron beam, thus eliminating the optics.

From a quality point of view, the electron beam recording process was far superior to the optical process. However, it did not lend itself to color recording because the conventional color television display techniques are not useable on a moving monochromatic medium such as electron-sensitive film. Because of the difficulty of consistently obtaining on a color television screen a picture of sufficient quality to produce acceptable color film by optical means, the photographic approach was also fairly unsuccessful.

Several attempts were made to adapt the electron beam recording process for color recording by recording the three color components of the video image on separate frames of the motion picture film negative, and then combining the component frames through conventional color filter devices during the printing process. However, none of these attempts produced satisfactory results because all of them relied, in one form or another, on a real-time transfer of a long sequence of video frames or their component colors from the video system to the film. "Real time," as used herein, means that a substantial number of color or monochromatic image frames are stored, recorded or otherwise processed in their true sequence (disregarding fields or field portions skipped for frame-rate conversion purposes) and at the rate at which they are used for creating the natural motion of the moving picture.

Specifically, prior art color recording systems known to applicant are of one of the following types:

a. Sequential systems in which the green, red and blue components of successive fields are used, with a single blue field being used for two frames to provide the 30-to-24 frames-per-second frame rate conversion needed to make video and motion picture systems compatible. These systems are objectionable because image movement between fields creates color separation.

b. Single-field storage systems in which a single field is stored in a sequential-access storage device, and scanned several times to provide the same color scans as the sequential system. This approach eliminates the color separation in motion areas but causes poor vertical resolution and dancing horizontal lines because of the alternation of A and B fields of opposite phase in the same scan alignment.

c. 72-frames-per-second recording systems using oscillating-beam techniques to record two fields simultaneously by moving the beam up and down between two adjacent lines at about a 14 MHz rate. These systems record full color in real time, but they sacrifice vertical resolution and cause a 10 percent image area loss at the top and bottom of the picture. The frame rate conversion in these systems is achieved by skipping full fields and using a storage device (though not a random-access device) for delaying purposes. These systems are not adaptable to beam deflection enhancement techniques such as those shown in the copending application, Ser. No. 185,157 filed Sept. 30, 1971 entitled Method And Apparatus For Improving The Horizontal Sharpness Of Electronically Scanned Images, because the beam deflection would affect two lines at a time and thus degrade vertical resolution.

d. Laser-type systems in which separately modulated red, green, and blue laser beams are combined into a single full-color beam by mirrors. The full-color beam is then scanned by a rotating mirror system directly onto color film. Inasmuch as the scan system is mechanical, it does not permit the use of enhancing techniques based on scan manipulation. Also, these systems, being real-time systems, have to use half-field film advancing techniques for frame rate conversion The very short film advancing time allowed by these techniques causes severe registration problems on 35 mm film. In addition, the lack of persistence of a laser beam requires impractically accurate switching to eliminate annoying gaps or overlaps in the center of the picture.

e. Repetitive recording systems in which the red component of an entire reel of film is recorded in real time, the video tape is rewound, the green component is recorded, the tape is again rewound, and the blue components is recorded. As in other real-time systems, half-field film advance has to be used, with its attendant problems as discussed above. In addition, the relatively long time elapsing between the three runs causes registration and distortion problems due to the drift, with time, of the parameters of the optical and electronic components of the system.

SUMMARY OF THE INVENTION

The system of this invention is based on the use of a random-access memory device to store video information in real time, and to retrieve or read out this information in selective patterns to record the film at its proper frame rate in non-real time.

Essentially, the preferred system described herein operates on the principle of storing a group of complete video tape image fields in real time on successive tracks of a storage medium, such as a multi-track disc, and simultaneously (but at a different rate) repetitively retrieving the component colors of the stored fields two at a time, with a full field interval between each pair of fields. In this manner, the film is recorded one monochromatic frame at a time with sufficient film advancing time between each frame for proper registration of the next film frame.

The recording sequence for one full color film frame according to the invention is as follows: blue field 1; blue field 2; blank field for film advance; red field 2; red field 1; blank field for film advance; green field 1; green field 2; and blank field for film advance. The color sequence is not material and is given as a matter of example only. the total recording time for a full-color film frame is therefore 9 fields, or 0.15 seconds. The video image, on the other hand, is stored in real time, i.e., 0.033 seconds per frame. The extra time between the storing of *n* video tape frames and the recording of 0.8 *n* film frames (which correspond to *n* video frames) is used for resetting (i.e., back-spacing and cueing) the video tape between groups of video frames.

The system of this invention, by taking advantage of the system's capability of repetitive retrieval of stored image fields in any sequence and combination, makes possible the use of advanced picture quality enhancing which operate on a basis of comparing information from one or more successive video fields to produce a recordable film field.

It is thus the object of this invention to provide a system capable of receiving video information in real time and recording this information on film in other than real time.

It is a further object of this invention to provide a system of the type described based on the use of a random-access memory or storage device.

It is another object of this invention to provide a video-tape-to-film conversion system specially adapted for noise-free electron beam recording of color images.

It is yet another object of the invention to provide a system of the type described which combines continuous film recording with a random and repetitive video image field retrieving capability to allow the use of signal processing techniques based on field comparison procedures.

It is a still further object of the invention to provide a system of the type described in which the recording cycle of a full-color film frame is composed of three monochromatic subcycles each consisting of a pair of adjacent monochromatic fields followed by a full blank field during which the film advance occurs.

BRIEF DESCRIPTION OF THE DRAWINGS

FIG. 1, the single FIGURE of the drawing, is a block diagram illustrating the basic system of the invention.

DESCRIPTION OF THE PREFERRED EMBODIMENT

Referring first to FIG. 1, the physical components of the system of this invention in its simplest form consist essentially of a videotape recorder 10, a field storage device or random-access memory 12, an electron-beam recorder 14 having a film transport mechanism 16, and a timing and selection logic 18. In the preferred embodiment, however, for reasons set out hereinafter, the invention further uses a motion detector and combiner 20, a color separator 22, and a color selector 24. Some of these components can, and normally would, be combined in a single physical device, and other system components (not shown) may be provided as necessary for proper signal interfacing, scan control, and signal enhancement.

The video tape recorder 10 is of an intermittently operable type which can be automatically stopped and cued to play back the recorded image fields in discrete groups of predetermined length. Such recorders are currently commercially available.

The storage device or memory 12 may be of the digital or analog type, depending on whether the video information to be stored is digital or analog. In the preferred embodiment using a standard interlaced-fields, 30-frame-per-second television signal, the storage device 12 is preferably a standard twenty-two-channel magnetic disc revolving at 3,600 rpm, so that each revolution of the disc corresponds exactly to one field interval of the video tape signal.

In the preferred embodiment of the invention, the motion detector and combiner 20 may be of the type described in the co-pending application, Ser. No. 209,910, filed Dec. 20, 1971 and entitled Noise Reduction System For Video Signals. This device, in its preferred form, has four inputs A, B, C, D adapted to simultaneously accept four different field signals of alternating chroma phase. The device combines the stationary portions of the four input fields to achieve substantial noise reduction and superior luminance-chroma separation in the stationary portions of the image, by using the redundancy of information contained in those image portions over a group of frames. The moving portions of the image are passed without combining and are chroma-separated by using more conventional but less effective luminance-chroma separation techniques.

The prime input of device 20 is C; that is, all portions of the field signal applied to C are passed through device 20. By contrast, only the stationary portions of the field signals applied to inputs A, B, and D are used. Thus, in the following discussion, the field in the C position will be referred to as the prime field, whereas the fields in the A, B, and D positions will be referred to as the informational fields.

STORAGE CHANNELS

| TIME INT. | 301 | 302 | 303 | 304 | 305 | 306 | 307 | 308 | 309 | 310 | 311 | 312 | 313 | 314 | 315 | 316 | 317 | 318 | 319 | 320 | 321 | 322 | COLOR SELECT. | RECORD COND. | Rec. V-T. Fd. |
|---|---|---|---|---|---|---|---|---|---|---|---|---|---|---|---|---|---|---|---|---|---|---|---|---|---|
| 101 | | | A | | B | | C | | D | | | | | | | | | | | | | | Blue | Reset | 525 |
| 102 | | A | | B | | C | | D | | | | | | | | | | | | | | | Blue | | 524 |
| 103 | | | | | | | | | | | | | | | | | | | | | | | | | |
| 104 | | A | | B | | C | | D | | | | | | | | | | | | | | | Red | | 524 |
| 105 | | | A | | B | | C | | D | | | | | | | | | | | | | | Red | | 525 |
| 106 | | | | | | | | | | | | | | | | | | | | | | | | | |
| 107 | | | A | | B | | C | | D | | | | | | | | | | | | | | Green | | 525 |
| 108 | | A | | B | | C | | D | | | | | | | | | | | | | | | Green | | 524 |
| 109 | | | | | | | | | | | | | | | | | | | | | | | | | |
| 110 | | | | A | | B | | C | | D | | | E | | | | | | | | | | Blue | | 526 |
| 111 | | | | | A | | B | | C | | D | | 531 | E | | | | | | | | | Blue | Store | 527 |
| 112 | | | | | | | | | | | | | | 532 | E | | | | | | | | | | |
| 113 | | | | | A | | B | | C | | D | | | | 533 | E | | | | | | | Red | | 527 |
| 114 | | | | A | | B | | C | | D | | | | | | 534 | E | | | | | | Red | | 526 |
| 115 | | | | | | | | | | | | | | | | | 535 | E | | | | | | | |
| 116 | | | | A | | B | | C | | D | | | | | | | | 536 | E | | | | Green | | 526 |
| 117 | | | | | A | | B | | C | | D | | | | | | | | 537 | E | | | Green | | 527 |
| 118 | | | | | | | | | | | | | | | | | | | | 538 | E | | | | |
| 119 | | | | | | | A | | B | | C | | D | | | | | | | | 539 | E | Blue | | 529 |
| 120 | E | | | | | | | A | | B | | C | | D | | | | | | | | 540 | Blue | | 530 |
| 121 | 541 | E | | | | | | | | | | | | | | | | | | | | | | | |
| 122 | | 542 | E | | | | | A | | B | | C | | D | | | | | | | | | Red | | 530 |
| 123 | | | 543 | E | | | A | | B | | C | | D | | | | | | | | | | Red | | 529 |
| 124 | | | | 544 | E | | | | | | | | | | | | | | | | | | | | |
| 125 | | | | | 545 | | A | | B | | C | | D | | | | | | | | | | Green | | 529 |
| 126 | | | | | | | | A | | B | | C | | D | | | | | | | | | Green | Reset | 530 |
| 127 | | | | | | | | | | | | | | | | | | | | | | | | | |
| 128 | | | | | | | | | | A | | B | | C | | D | | | | | | | Blue | | 532 |
| 129 | | | | | | | | | A | | B | | C | | D | | | | | | | | Blue | | 531 |
| 130 | | | | | | | | | | | | | | | | | | | | | | | | | |
| 161 | D | | | | | | | | | | | | | | | | A | | B | | C | | Green | | 539 |
| 162 | | D | | | | | | | | | | | | | | | | A | | B | | C | Green | | 540 |
| 163 | | | | | | | | | | | | | | | | | | | | | | | | | |
| 164 | | C | | D | | | | | | | | | | | | | | | | A | | B | Blue | | 542 |
| 165 | C | | D | | | E | | | | | | | | | | | | | A | | B | | Blue | | 541 |
| 166 | | | | | | 546 | E | | | | | | | | | | | | | | | | | Store | |
| 167 | C | | D | | | | 547 | E | | | | | | | | | | | A | | B | | Red | | 541 |
| 168 | | C | | D | | | | 548 | E | | | | | | | | | | | A | | B | Red | | 542 |
| 169 | | | | | | | | | 549 | E | | | | | | | | | | | | | | | |
| 179 | A | | B | | C | | D | | | | | | | | | | | | 559 | E | | | Green | | 545 |
| 180 | | B | | C | | D | | | | | | | | | | | | | | 560 | | A | Green | | 544 |
| 181 | | | | | | | | | | | | | | | | | | | | | | | | Reset | |
| 215 | | | | | | | | | | | A | | B | | C | | D | | | | | | Green | | 555 |
| 216 | | | | | | | | | | A | | B | | C | | D | | | | | | | Green | | 554 |
| 217 | | | | | | | | | | | | | | | | | | | | | | | | | |
| 218 | | | | | | | | | | | | A | | B | | C | | D | | | E | | Blue | | 556 |
| 219 | | | | | | | | | | | | | A | | B | | C | | D | | 561 | E | Blue | Store | 557 |
| 220 | | | | | | | | | | | | | | | | | | | | | | 562 | | | |

TABLE I

The chart of Table I illustrates the programming of the timing and selection logic 18 to carry out the concepts of the invention. The ordinate of the chart represents time intervals equal to one field of the video tape signal, i.e., one-sixtieth second, or one revolution of the storage disc of device 12. The abscissa of the chart represents the 22 recording and play-back channels of the storage disc. For clarity, the time intervals in Table I are numbered 101 through 220, the disc channels are numbered 301 through 322, and the fields of the video tape signal are numbered 509 through 562.

In the preferred embodiment of the invention, each field group transmitted by the recorder 10 to the storage device 12 consists of fifteen full-color fields. This number is not inflexible, but too long a group requires too many channels on the disc with no offsetting advantages, and too short a group provides insufficient time for proper resetting (i.e., stopping, backspacing, restarting, and cueing) of the video tape between field groups.

In the discussion of Table I, it has been assumed that at some time prior to time interval 101, fields 509 through 530 of the video tape were stored in channels 313 through 322 and 301 through 312, respectively, of the storage disc of storage device 12 or in the corresponding memory channels of whatever random-access memory device is chosen to constitute the storage device 12. It will be understood that the storage device is cyclic in nature, i.e., channel 301 is the next channel in sequence after channel 322.

The timing and selection logic 18 contains a master clock circuit, which is part of the timing and selection logic 18 and which may be driven by a conventional oscillator (not shown). The master clock circuit provides the time standard or synchronization reference for the video tape recorder 10, the storage device 12, the scan circuits of the electron beam recorder 14, and the film transport mechanism 16. The logic 18 itself consists essentially of conventional counting circuits which switch the various components of the system in conventional ways in accordance with the operational pattern of Table I.

Referring now to Table I, the logic 18 during time 101 applies the contents of storage channels 303, 305, 307 and 309 (which contain adjacent video tape fields of the same, i.e., odd, parity) to the inputs A, B, C, and D, respectively, of combiner 20. At the same time, the logic 18 switches color selector 24 to select the blue component of the full-color combined signal produced by combiner 20. Inasmuch as C is the prime field input as described above, the electron beam recorder 14 thus records the blue component of video tape field 525 (the field previously stored in channel 307) on the first frame of monochromatic film. In each instance mentioned herein, the recorded field component is a comparison-enhanced version of the corresponding video tape field component.

During time 102, the logic 18 connects storage channels 302, 304, 306, and 308 (which contain adjacent video tape fields of even parity) to inputs A, B, C, and D, respectively, of combiner 20. With the other settings unchanged, this results in the recording of the blue component of video tape field 524 (which has previously been stored in channel 306.)

During time 103, logic 18 again connects channels 303, 305, 307, and 309 to combiner 20. However, during time 103, logic 118 applies a blanking signal to recorder 14 to render it inoperative. At the same time, the logic 18 triggers the film advance to advance the film to the next frame. It will be noted that the film advance has an entire field interval at its disposal, a fact which is very important, as pointed out hereinabove, to achieve proper registration of the film for accurate subsequent optical combining of the three monochromatic film frames containing the blue, red and green components of the picture into a single frame of color film.

During time 104, channels 302, 304, 306 and 308 are again connected to combiner 20. At this time, however, logic 18 switches the color selector 24 to red, and the red component of field 524 is recorded on the second frame of the monochromatic film. In the same manner, the red component of field 525 is recorded during time 105.

Following a film advance, with the recorder 14 blanked out, during time 106, the green component of field 525 is recorded during time 107, and the green component of field 524 is recorded during time 108. Another film advance follows at time 109 to complete the recording of the three monochromatic film frames which are combined by the optical printing process to form the completed color film frame composed of video tape fields 524 and 525.

It will be seen that the operational pattern of the system is such that odd-numbered fields are always read, processed, and recorded during odd-numbered time intervals, and even-numbered fields are always read, processed, and recorded during even-numbered time intervals. This assures the proper alternation of odd-field and even-field signals in the system in synchronism with alternating interlaced odd-field and even-field scans. At the same time, the A, B, C and D inputs to combiner 20 are always successive odd fields or successive even fields of the video tape signal; hence they are always in the proper alternating phase relationship to permit operation of the chroma separation circuitry of combiner 20 as described in the aforementioned copending application, Ser. No. 209,910.

As will be readily apparent from Table I, the reading patterns from the storage device 12 during times 101 through 109 falls into a block (defined in Table I by solid vertical lines) encompassing the eight channels numbered 302 through 309. The prime fields of this block are confined to channels 306 and 307, as shown by the dotted vertical lines. Each of the channels 306 and 307 is read as the prime field three times, once during each three-time-interval color segment. With video tape fields 524 and 525 stored in channels 306 and 307, respectively, the color film frame produced during the time block 101 through 109 will consist of video tape fields 524 and 525.

During time intervals 110 through 118, the logic 18 shifts the reading operation to the block encompassing channels 304 through 311, i.e., a two-field shift. As a result of this shift, fields 526 and 527 (stored in channels 308 and 309, respectively) now become the prime fields, so that the color film frame produced by the time block 110–118 will consist of video tape fields 526 and 527.

At time 119, the logic 18 shifts the reading operation by three spaces instead of two. As a result, fields 529 and 530 (channels 311 and 312) become the prime fields. Field 528 (channel 310) thus never becomes the prime field, although it is used as an informational field during time intervals 110, 114, 116, 120, 122, 126, 128, 132 and 134. With the logic 18 alternating between two-channel and three-channel shifts at the end of each nine-time-interval time block, the same is true of fields 533, 538, etc.; in other words, every fifth video tape field is used for informational purposes only.

In this manner, the 30-frame-per-second frame rate of the video signal can readily be converted to the 24-frame-per-second frame rate of motion picture film with a minimum loss of picture information. It will be understood that other frame rate conversions may be achieved, or frame rate conversion omitted entirely, by appropriate modifications in the shift pattern of logic 18.

In Table I, the storage channels were assumed to contain fields 509 through 530 prior to time 101. By time 119, fields 529 and 530 become the prime fields, and the "D" input of combiner 20 requires fields 531 and 532 for informational purposes. Consequently, the next group of 15 color video tape fields must be stored in storage device 12 in time to meet this need.

The video tape on recorder 10 may, for the purposes of this system, be equipped with a cue track on which a cue signal is recorded every 15th field. Immediately following the storage of a group of 15 fields, the recorder 10 is reset. This is done by stopping and back-spacing the video tape by a predetermined amount depending on the mechanical parameters of recorder 10. Then, at the appropriate count of timing logic 18, the tape is re-started, brought up to speed, and synchronized with the master clock 26 through the timing logic 18 so that odd fields will be played back during odd time intervals and even fields during even time intervals.

When the cueing head of recorder 10 detects the cue signal, fifteen video tape fields are fed to the input of storage device 12 in real time. These fields are channeled by the timing logic 18 to successive channels of storage device 12, where they are stored in the appropriate odd-even sequence. Each storage operation (denoted in Table I by the number of the field stored) is preceded during the next previous time interval by an erasing operation (denoted "E" in Table I) which deletes the information previously stored in that channel.

Mechanical devices being what they are, it is possible for the video tape to mis-cue by locking into synchronism with the master clock 26 too early or too late. Consequently, the storage of video tape field 531 in channel 313 may occur at time 109 or 113 instead of time 111. An examination of Table I will readily show that the system of this invention provides for such a contingency by allowing the storage sequence to be shifted up or down by several odd (or even) spaces without encroaching upon a reading block.

In the normal operation of the system, a minimum one-channel clearance (channel 312 at times 110, 111 and channel 306 at times 124, 125) is provided between each erase-record operation and the nearest reading block, to prevent interference due to spill-over. However, in an emergency a head failure in one of the storage channels can be temporarily coped with by switching the timing logic to skip the defective channel and one other one, so as to reduce the storage device from a twenty-two-channel device to a twenty-channel device. Elimination of channels in pairs is necessary to preserve the proper even-odd relationships of the system.

In the system of Table I, the storage of a group of fifteen color video tape fields (which takes place in real time) requires 15 time intervals. The recording, on monochromatic film, of the 36 monochromatic film fields corresponding to the 15 color video tape fields requires 54 time intervals, leaving thirty-nine time intervals (about two-thirds of a second) available for resetting purposes. In practice, as Table I shows, the reset time alternates between 40 and 38 time intervals due to the necessity of maintaining the proper odd-even relationship between all the system parameters. It will be seen that the minimum length of the field group stored during each store-reset cycle is determined by how fast the video tape can be reset, and that its maximum length is determined by the number of storage channels which can economically be provided.

Thus, the store-and-record process repeats itself in the preferred embodiment about every 54 time intervals or 0.9 seconds until the entire videotape program is recorded on film. Due to the frame rate conversion, the end-product full-color film alternates between pairs of frames identical in content to the corresponding full-color video tape frames, and pairs of frames whose even field comes from one video tape frame and whose odd field comes from the next following video tape frame.

In some instances, it may be desirable to use sharpness enhancing techniques requiring a double scan. The system of this invention is readily adaptable to such techniques by simply programming the timing logic to run each three-time-interval segment of Table I twice, which causes the reset time to be increased from 39 time intervals to an average of 93 time intervals.

What is claimed is:

1. A method for recording color video signals on motion picture film comprising the steps of:

a. transferring a signal group consisting of predetermined number of full-color video image input fields from a color video signal source to a signal storage device in real time;
b. repeatedly retrieving selected fields of said group at time intervals differing from their real time intervals;
c. processing said retrieved input field signals to produce monochromatic output frames each consisting of at least two fields, each selected input field being retrieved at least once for each primary color; and
d. recording each said single-color output frame on a separate increment of motion picture film.

2. A system for converting electronic image information from real to non-real time, comprising:

a. a source of electronic image information;
b. random-access storage means connected to receive said information from said source in real time;
c. logic means connected to said storage means and arranged to read said information out of said storage means in non-real time; and
d. means operatively connected to said storage means for utilizing said information read out of said storage means in non-real time.

3. A video-to-film conversion system, comprising:

a. a source of video image information;
b. random-access storage means connected to receive said information from said source in real time;

c. logic means connected to said storage means and arranged to read said information out of said storage means in non-real time; and d. means for recording electronic signals on film, said means being operatively connected to said storage means to receive said information in non-real time, and being arranged to record said information on said film in non-real time.

4. A color videotape-to-film conversion system, comprising:

a. intermittently operable video tape means for intermittently playing back groups of full-color video tape fields, each containing a predetermined number of fields;

b. random-access storage means arranged to store at least said predetermined number of fields;

c. color selector means;

d. monochromatic film recording means; and e. timing and selection logic means arranged to store groups of video tape fields in said storage means, to repetitively retrieve selected ones of said stored fields for processing through said color selector, and to operate said color selector and the film transport mechanism of said film recording means to record pairs of monochromatic fields, each pair being separated from the next by one full field interval during which the film is advanced.

5. The system of claim 4, further comprising frame rate converting motion detector and combiner means having a prime field input and a plurality of informational field inputs, in which said timing and selection logic means are further arranged to retrieve successive odd-field and even-field subgroups and apply the same to said inputs in such a sequence that selected ones of said video tape fields are presented only to said informational field inputs but never to said prime field input.

6. The system of claim 5, in which all of said video tape fields are used as informational fields but only predetermined ones of said video tape fields are used as prime fields.

7. A method of producing, from a color video tape, a monochromatic film having groups of successive frames each containing one of the three primary color components of a given color video tape image, comprising the steps of:

a. storing a group of color video tape image fields on discrete portions of a random-access storage medium;

b. repeatedly alternately retrieving the odd and even field of a selected pair of fields stored in said storage medium;

c. separating the retrieved fields into their three primary color components;

d. recording the first color components of said pair of fields successively on a first frame of said film;

e. ceasing said recording for one field time following the recording of said first color components, and advancing said film by one frame during said one field time; and f. repeating said recording step and said recording cessation step for the second color components and for the third color components of said pair of fields.

8. The method of claim 7, further comprising the step of retrieving adjacent stored fields of the same parity simultaneously with the retrieval of each said selected field, and combining portions of said selected field and said adjacent like-parity fields to form a composite field of which said selected field is the prime field.

9. The method of claim 8, in which predetermined ones of said stored fields are omitted in the selection of pairs of prime fields.

10. The method of claim 8, in which the retrieval of said fields is continuous but not in real time, and the storage operation is conducted intermittently but in real time concurrently with said retrieval on portions of said random-access medium not being used for retrieval during the storage operation.

* * * * *